United States Patent
Tyagi

(10) Patent No.: US 11,921,826 B2
(45) Date of Patent: *Mar. 5, 2024

(54) AUTOMATICALLY DETECTING MISUSE OF LICENSED SOFTWARE

(71) Applicant: ServiceNow, Inc., Santa Clara, CA (US)

(72) Inventor: Rohan Tyagi, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,103

(22) Filed: Jul. 21, 2022

(65) Prior Publication Data

US 2022/0358188 A1 Nov. 10, 2022

Related U.S. Application Data

(63) Continuation of application No. 16/402,072, filed on May 2, 2019, now Pat. No. 11,403,370.

(51) Int. Cl.
*G06F 21/10* (2013.01)
*G06F 16/22* (2019.01)
*H04L 41/04* (2022.01)

(52) U.S. Cl.
CPC ............ *G06F 21/105* (2013.01); *G06F 16/22* (2019.01); *H04L 41/04* (2013.01); *G06F 21/1077* (2023.08)

(58) Field of Classification Search
CPC ................... G06F 21/105; G06F 16/22; G06F 2221/0773; H04L 41/04; H04L 43/0817; H04L 43/10

See application file for complete search history.

(56) References Cited

U.S. PATENT DOCUMENTS

| 6,056,786 | A | * | 5/2000 | Rivera | ................ | G06F 21/105 |
| | | | | | | 709/229 |
| 6,321,229 | B1 | | 11/2001 | Goldman | | |
| 6,609,122 | B1 | | 8/2003 | Ensor | | |
| 7,020,706 | B2 | | 3/2006 | Cates | | |
| 7,028,301 | B2 | | 4/2006 | Ding | | |

(Continued)

OTHER PUBLICATIONS

TCP connection discovery, ServiceNow Documentation, 6 pages.
(Continued)

*Primary Examiner* — Brian F Shaw
(74) *Attorney, Agent, or Firm* — FLETCHER YODER PC

(57) ABSTRACT

An example embodiment may involve communicating with a server to separately access first and second records of sessions between the server and computing devices of a network, the first record including a first set of fields not present in the second record and the second record includes a second set of fields not present in the first record; identifying a common field present the first and second records; correlating information across the first and second records using the common field; using a set of license misuse criteria to identify, from the correlated information, (i) a set of the sessions that meets the set of criteria and (ii) a network address of a target device involved in the set of sessions; identifying the target device using the network address; and storing an indication identifying the target device as a potential source of misuse of licensed software executable on the server.

20 Claims, 15 Drawing Sheets

(56) References Cited

U.S. PATENT DOCUMENTS

| | | |
|---|---|---|
| 7,062,683 B2 | 6/2006 | Warpenburg |
| 7,131,037 B1 | 10/2006 | LeFaive |
| 7,170,864 B2 | 1/2007 | Matharu |
| 7,610,512 B2 | 11/2009 | Trinon |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,098,322 B2 | 8/2015 | Apte |
| 9,239,857 B2 | 1/2016 | Trinon |
| 9,317,327 B2 | 4/2016 | Apte |
| 9,363,252 B2 | 6/2016 | Meuller |
| 9,515,883 B2 | 12/2016 | Polinati |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 2007/0004396 A1* | 1/2007 | Connelly ............... H04W 4/24 455/423 |
| 2013/0144755 A1 | 6/2013 | Mowatt |

OTHER PUBLICATIONS

"A guide to SAP Indirect Usage," Snow Software, Snowsoftware.com, 2016, 8 pages.

Cochlin, J., "SAP Indirect Access Explained," JNC Consultancy, Dec. 22, 2017, 13 pages, URL: https://www.incconsultancy.com/sap-indirect-access-explained/#.

* cited by examiner

| Session Record | |
|---|---|
| Connection ID: | 55D7273D600009B |
| Username: | User_1 |
| Source IP: | 1,234.56.789 |
| Destination IP: | 12.345.678.90 |
| TCP port: | 3300 |
| Log-on method: | RFC |
| Transactions: | 1 |
| Transaction time: | 27,000 ms |
| Remote execution time: | 26,999 ms |
| Idle time: | 0 ms |
| Data send time: | 0 ms |
| Data receive time: | 1 ms |
| Log-on time: | 1 ms |
| Sent data: | 2,190 Bytes |
| Received data: | 73,500 Bytes |
| Authorization time: | 0 ms |

FIG. 8A

| Transaction Record | |
|---|---|
| Call number: | 1 |
| Destination: | 12.345.678.90 |
| Connection ID: | 55D7273D600009B |
| Username: | User_1 |
| Function name: | FUNCTION_X |
| Calling time: | 3.731 ms |
| Remote execution time: | 3.730 ms |
| Data send time: | 0 ms |
| Data receive time: | 1 ms |
| Idle time: | 0 ms |
| Sent data: | 25,954 Bytes |
| Received data: | 11,153 Bytes |
| Call number: | 1 |
| Destination: | 12.345.678.90 |
| Connection ID: | 55D7273D600009B |
| Username: | User_1 |
| Function name: | FUNCTION_X |
| Calling time: | 1.350 ms |
| Remote execution time: | 1.349 ms |
| Data send time: | 0 ms |
| Data receive time: | 0 ms |
| Idle time: | 0 ms |
| Sent data: | 8,055 Bytes |
| Received data: | 9,401 Bytes |

FIG. 8B

TRANSACTION ACTIVITY 1100

| User | Calls | Call Time | Data Received | Data Sent | Hostname | Path | Port |
|---|---|---|---|---|---|---|---|
| User X | 957 | 955,671 | 2,123,112 | 6,263,728 | Host1.rnmp.com | /software/abc/xyz | 8000 |
| User Y | 957 | 955,671 | 2,123,112 | 6,263,728 | Host1.rnmp.com | N/A | 8000 |
| User Z | 1239 | 1,358,599 | 2,954,123 | 6,728,300 | Host2.rnmp.com | N/A | 50000 |
| ... | | | | | | | |

FIG. 11

LICENSED SOFTWARE COMPLIANCE

| User | Steps | Total CPU | Total DB Time | Peak Count | Peak Date | DB Read Record | DB Change Record | Period | Calls | Call Time | Data Received | Data Sent | Hostname | Path | Port |
|---|---|---|---|---|---|---|---|---|---|---|---|---|---|---|---|
| User X | 56 | 57,600 | 56,777 | 5 | 6/24/2019 | 113 | 90 | 6/1/2019-6/30/2019 | 957 | 955,671 | 2,123,112 | 6,263,728 | Host1.mmp.com | /software/abc/xyz | 8000 |
| User Y | 20 | 407,979 | 200,541 | 2 | 6/5/2019 | 344 | 282 | 6/1/2019-6/30/2019 | 957 | 955,671 | 2,123,112 | 6,263,728 | Host1.mmp.com | N/A | 8000 |
| User Z | 37 | 233,300 | 212,618 | 4 | 6/17/2019 | 265 | 247 | 6/1/2019-6/30/2019 | 1239 | 1,358,599 | 2,954,123 | 6,726,300 | Host2.mmp.com | N/A | 50000 |

FIG. 12

AUTOMATICALLY DETECTING MISUSE OF LICENSED SOFTWARE

CROSS-REFERENCE TO RELATED APPLICATION

This is a continuation of U.S. patent application Ser. No. 16/402,072, filed on May 2, 2019, which is hereby incorporated by reference in its entirety.

BACKGROUND

An enterprise may license software and install the licensed software on various computing devices in the enterprise's managed network. In order to comply with license rights associated with the licensed software, it can be desirable for the enterprise to keep track of where and how the licensed software is used in the managed network. However, tracking use and detecting misuse of licensed software can be difficult, particularly when a large number of users and devices in the managed network and/or outside the managed network are using the licensed software and/or when the licensed software is licensed in accordance with a complex licensing model.

SUMMARY

Some license agreements may allow devices in an enterprise's managed network to indirectly access the licensed software via intermediary software custom-built by the enterprise and/or developed by a third-party.

The manner in which software is licensed to an enterprise for indirect access use can vary, and thus, scenarios in which an enterprise can be considered to be misusing software licensed for indirect access can vary as well. For example, multiple concurrent uses of the licensed software, all using the same account, could be considered misuse. As another example, if only a certain number of users in the managed network are licensed to use the licensed software, but more than that number of users are using the licensed software over time or concurrently, that could be considered misuse as well.

Due to the dynamic nature of enterprises as well as the various models for licensing software, it may be desirable for an enterprise to be able to automatically detect and flag scenarios in which software licensed by the enterprise is potentially being misused. In addition, it may be desirable for the enterprise to be able to identify users and/or computing devices within the managed network that are associated with such misuse. This may help the enterprise avoid the risk of penalties resulting from license misuse. The enterprise may also be able to learn from license misuse scenarios and take action to reduce or eliminate the occurrence of such scenarios.

The present disclosure provides a software application that is executable on a computing device of a managed network and configured for detecting activity indicative of misuse of licensed software licenses, as well as identifying and flagging computing devices that are involved with such misuse. In particular, the software application can be configured to analyze records of sessions in which computing devices are accessing licensed software. Using a set of criteria that can be tailored for the enterprise to detect potential software license misuse, the software application can identify one or more sessions that meet the set of criteria, as well as a network address of a "target computing device"—namely, a computing device related to the managed network that was involved in each identified session and thus a potential source of license misuse. Then, the software application can identify the target computing device using the network address and store in memory an indication that identifies the target computing device as a potential source of license misuse.

Accordingly, a first example embodiment may involve a method performed by a software application executable on a computing device. The method may involve communicating with a server device of a managed network to separately access, from records of communication sessions between the server device and computing devices related to the managed network, a first record and a second record. The first record may include a first set of one or more fields that are not present in the second record. The second record may include a second set of one or more fields that are not present in the first record. The communication sessions may be initiated through use of accounts authorized to access the server device by licenses associated with a licensed software application executable on the server device. The managed network may contain the server device and a database associated with the licensed software application. The database may store the records. The records may include network addresses of the computing devices that are involved in the communication sessions.

The method may also involve identifying a common field that is present in both the first record and the second record. The method may also involve correlating session information across the first record and the second record using the common field. The method may also involve using a set of license misuse criteria to identify, from the correlated session information, (i) a set of the communication sessions that meets the set of license misuse criteria and (ii) a network address of a target computing device involved in the set of communication sessions. The set of license misuse criteria may comprise at least one of a number of bytes transmitted between the target computing device and the server device during the set of communication sessions exceeding a threshold number of bytes, or the set of communication sessions including more than a threshold number of communication sessions. The method may also involve, based on the network address of the target computing device, identifying the target computing device. The method may also involve storing in memory an indication that identifies the target computing device as a potential source of misuse of one or more of the licenses.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8A is a record associated with a communication session during which licensed software is accessed, in accordance with example embodiments.

FIG. 8B is another record associated with a communication session during which licensed software is accessed, in accordance with example embodiments.

FIG. 11 depicts an example record associated with multiple communication sessions during which licensed software has been accessed, in accordance with example embodiments.

FIG. 12 is an example graphical user interface (GUI) including data from the two example records of FIG. 10 and FIG. 11, in accordance with example embodiments.

DETAILED DESCRIPTION

Figure 1:
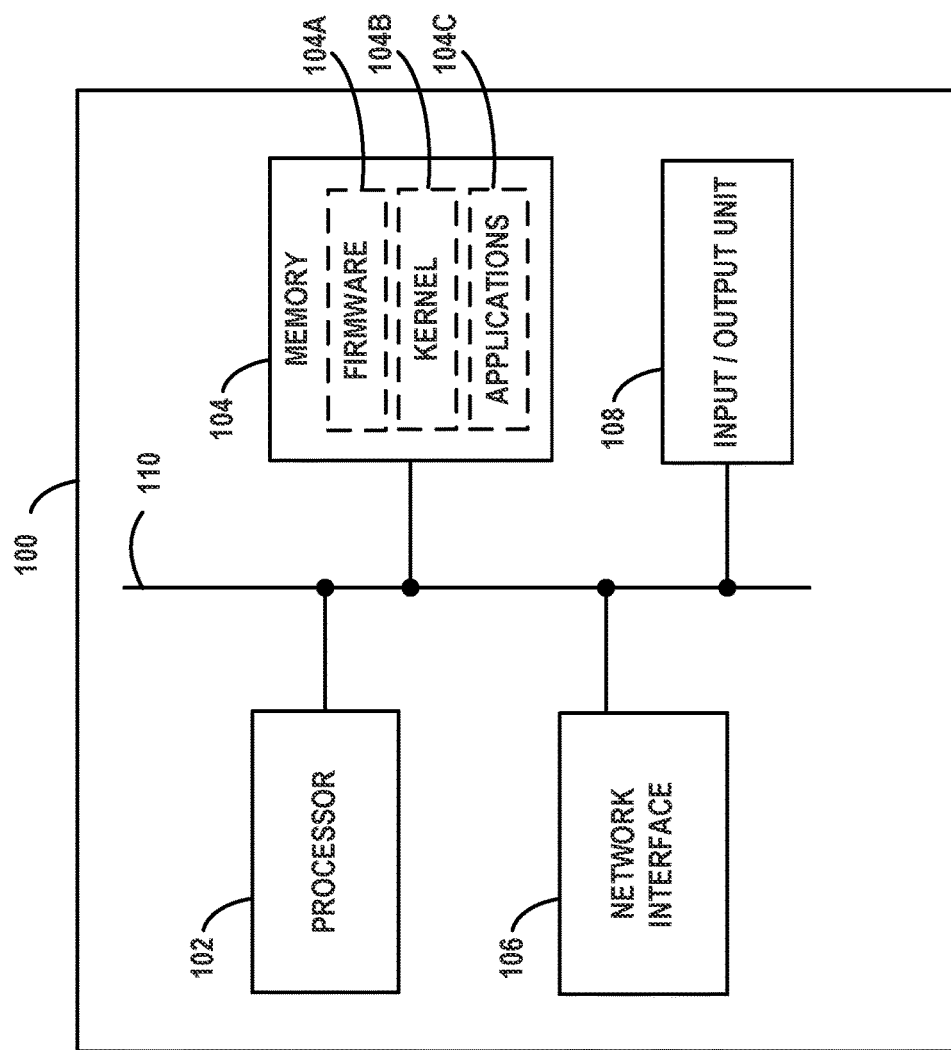
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
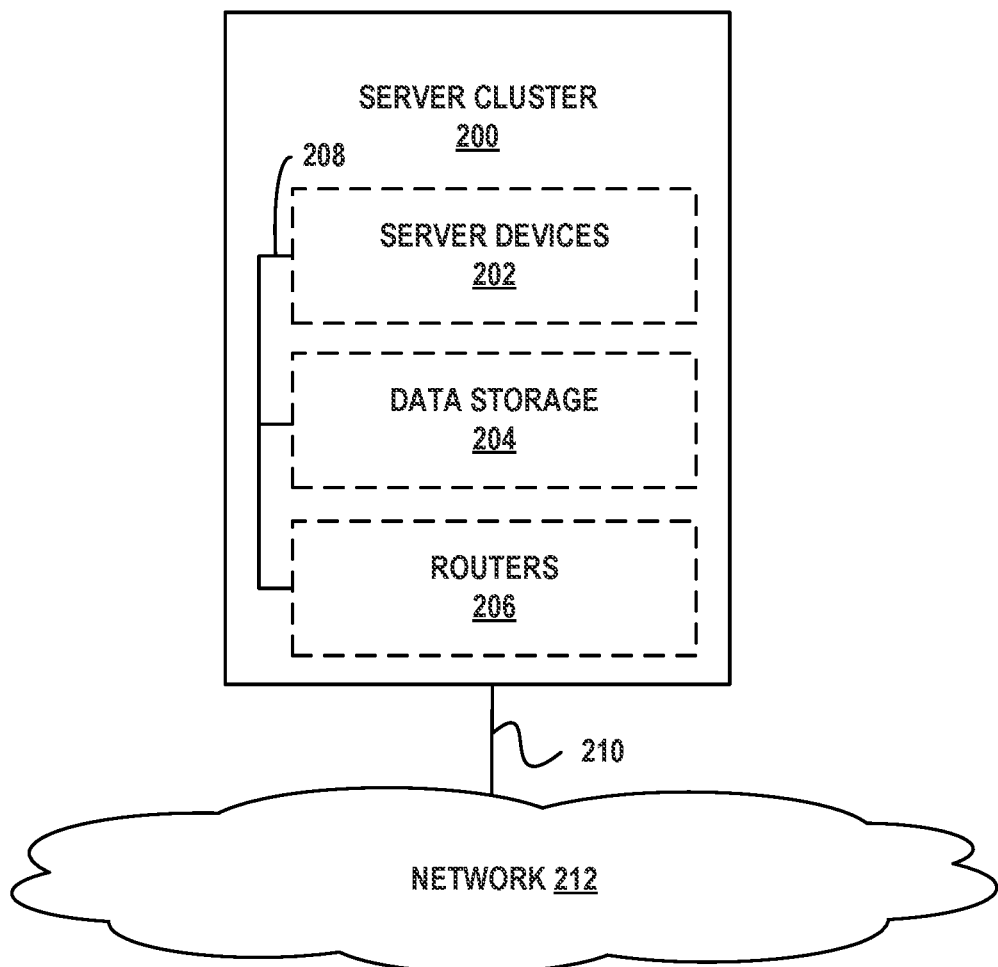
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
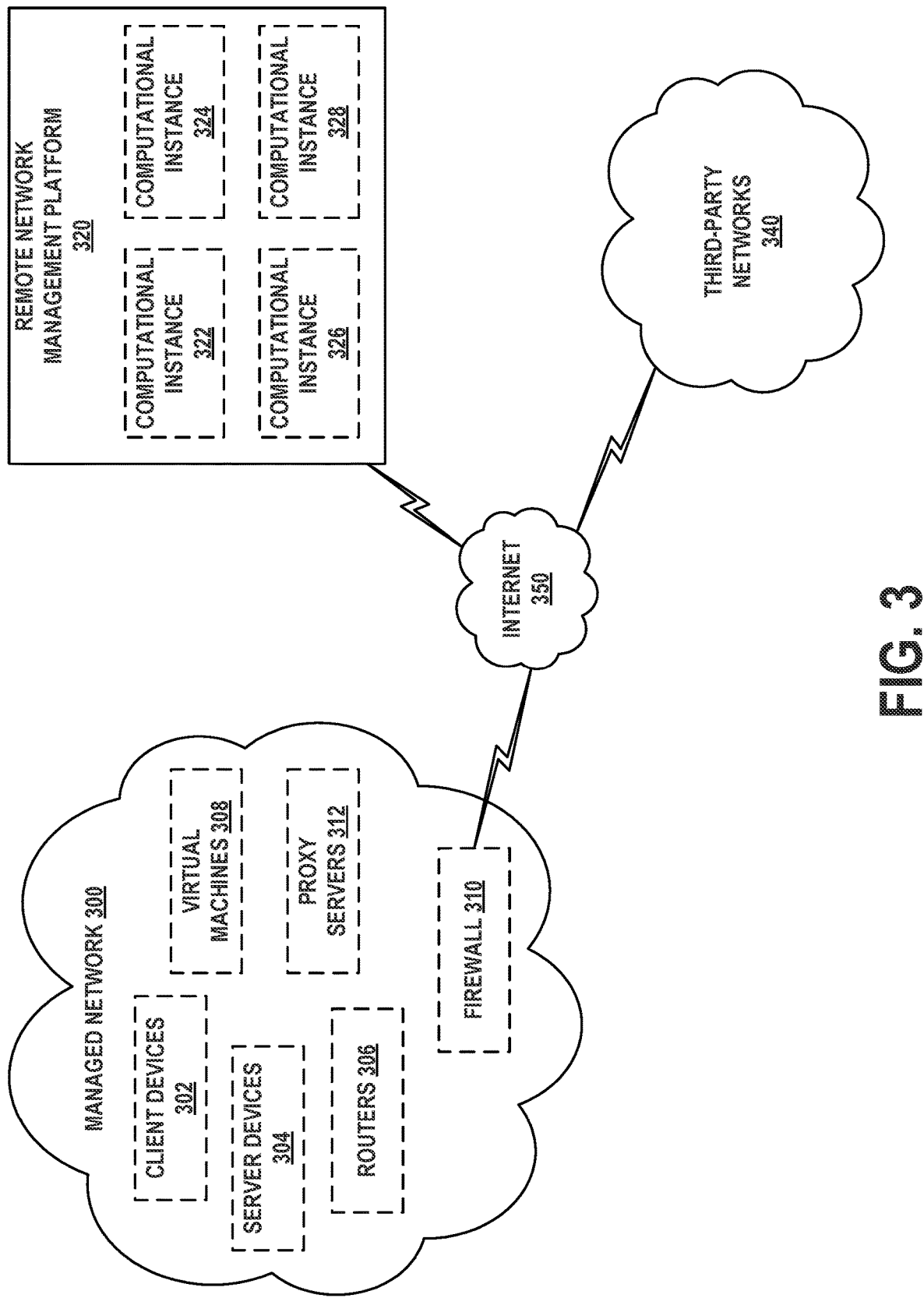
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
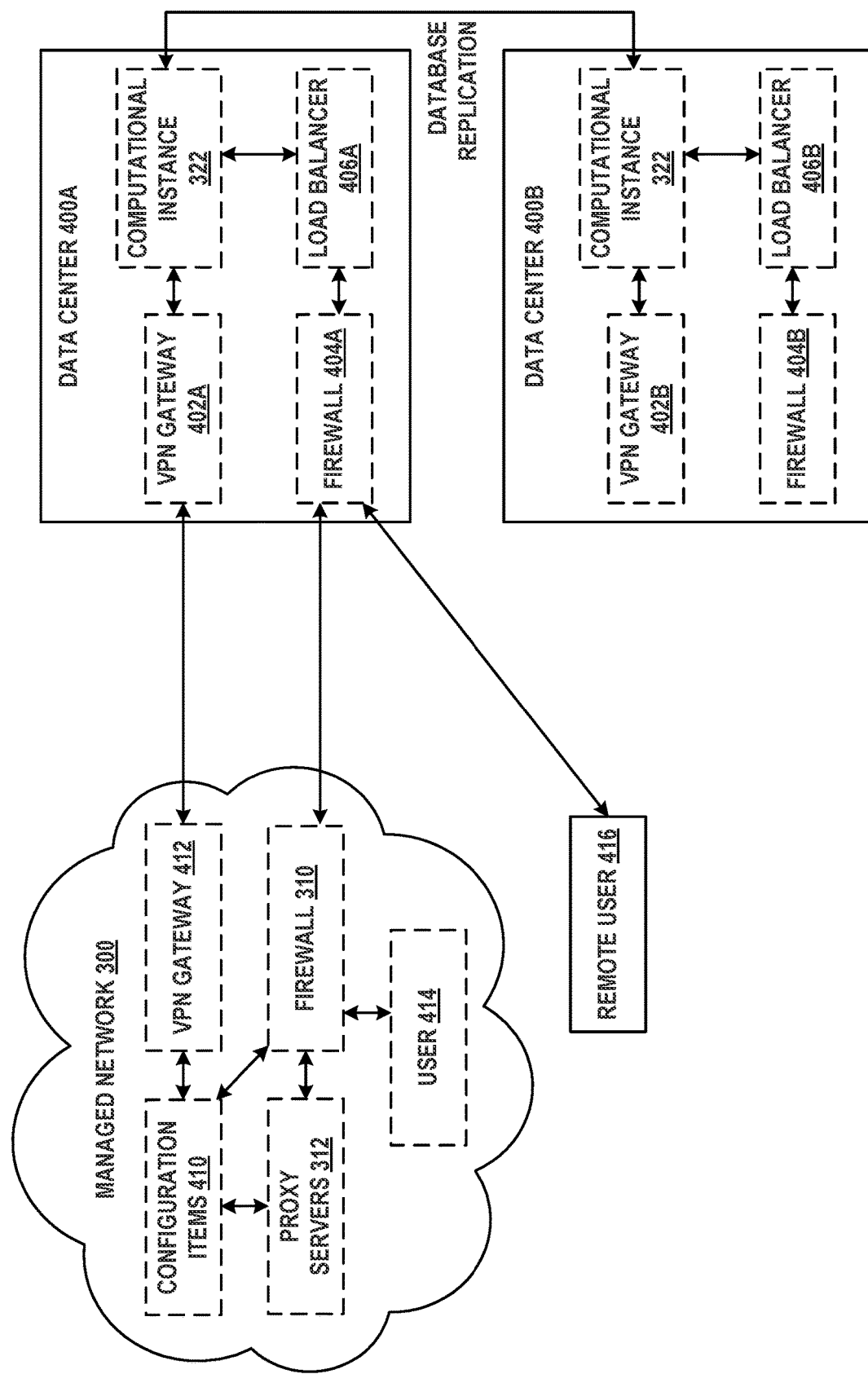
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B.

After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
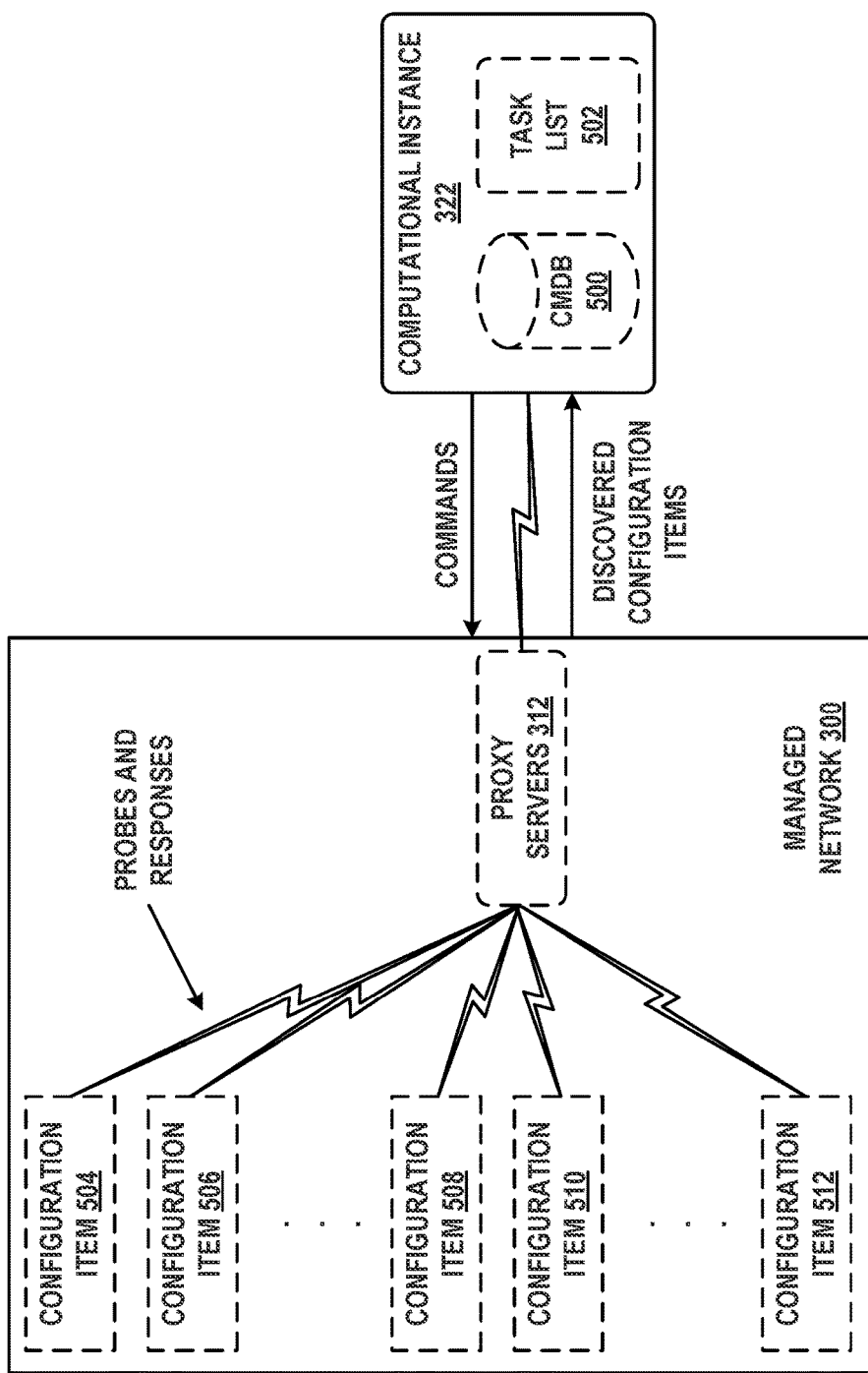
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
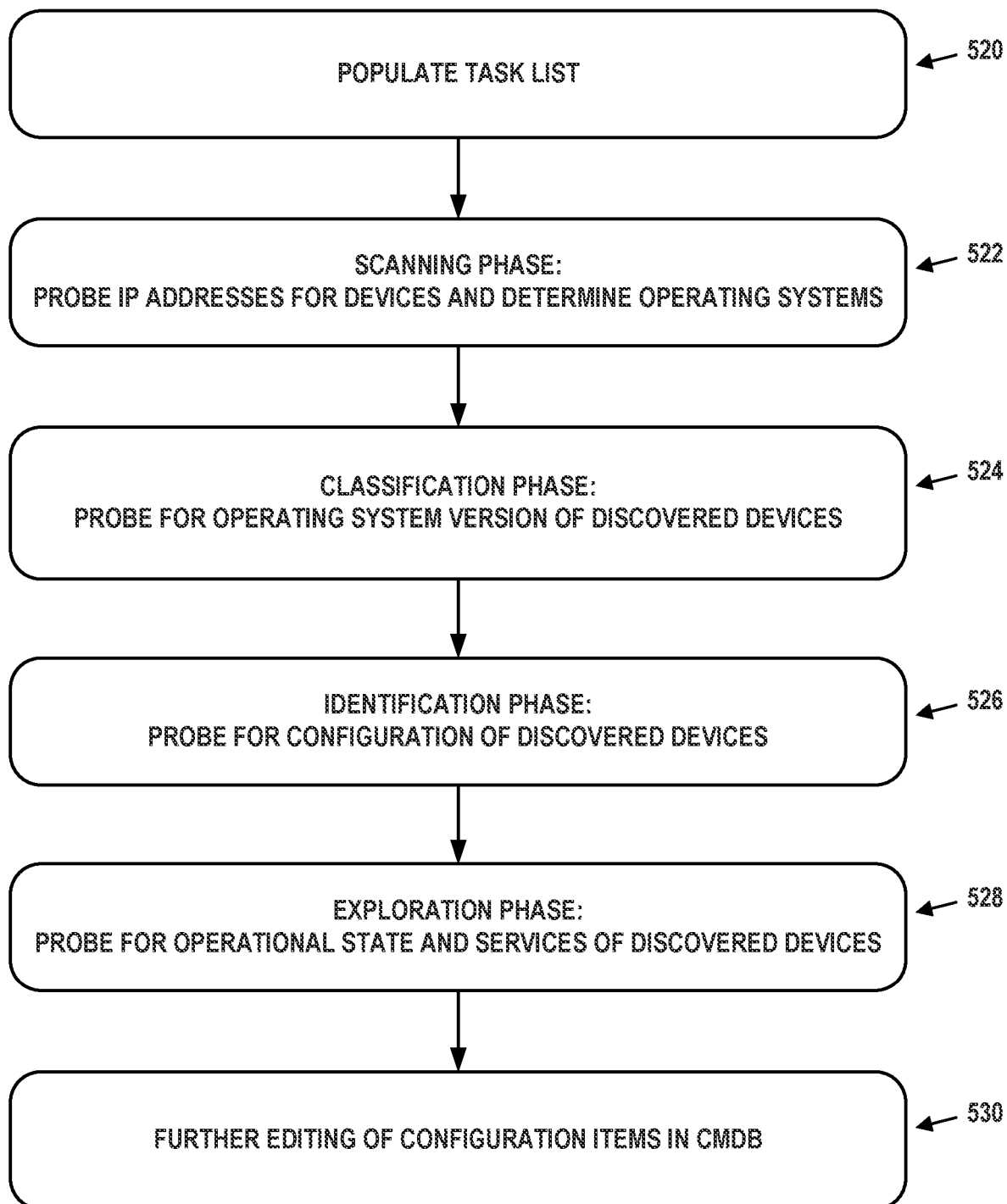
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE SOFTWARE LICENSE MANAGEMENT

While some software applications used by managed network 300 may be hosted by an aPaaS system, as described above in relation to FIGS. 1 through 4, others may be installed on the individual computing, client, and/or server devices themselves. Such software is often proprietary, and may be licensed in various ways. An example of such licensed software is software is enterprise resource planning (ERP) software, which can take the form of one software application or suite of software applications that are configured for use by an enterprise in collecting, storing, managing, and interpreting data related to a variety of enterprise operations, such as human resources, finance, information technology, supply chain, customer relationship management, or other operations that are unique to the enterprise. Other examples types of licensed software are possible as well.

Regardless of the licensing scheme, the enterprise may attempt to keep track of which of its computing, client, and/or server devices use what licensed software. To facilitate this, the enterprise may attempt to maintain software entitlement records, which provide information about software license rights held by the enterprise's managed network. Such license information may include information specific to various software applications. As an example, for a given software application, license information may include a publisher/vendor name for the software application, a publisher part number, a software model (e.g., a name, version, and/or edition of the software application), a license metric of the software application (e.g., whether the software application is licensed per computing device, per processor, per processor core, per user, etc.), and/or a license duration of the software application. Additionally or alternatively, such license information may include information that represents collective software usage for managed network 300, including but not limited to purchased rights (e.g., number of licenses purchased/held by managed network 300) and/or license metrics for managed network 300, among others.

In any case, by maintaining accurate software license information, the enterprise can even better track to what degree software usage complies with software license rights held by the managed network. Still, tracking software application usage across an entire enterprise may present challenges. A large enterprise may use thousands of separate computing devices, each of which may use a set of software applications. Further, such computing devices may go in and out of service, or require different software applications over time. Still further, different versions or builds of each software application may be installed across these computing devices.

Tracking the use of software within an enterprise may be achieved using an aPaaS system as described above in relation to FIGS. 1 through 5B. Such an aPaaS system may be particularly suited to tracking such software usage because the aPaaS system may already be configured to gather information from computing devices in managed networks such as the enterprise. Other techniques for tracking the use of software within an enterprise are possible as well.

As will be discussed in more detail below, the embodiments described herein provide a technical improvement over previous approaches for software asset management, particularly with respect to monitoring use of certain types of licensed software and accurately detecting misuses of such licenses. For example, existing techniques for software assert management can involve counting licenses and comparing the license count to a number of software installations. This can be performed on a cyclical basis, such as during audit cycles. By contrast, improved approaches described herein dynamically identify potential license misuse and can notify an administrator in real-time or close to real-time, rather than waiting for an audit cycle or other time to assess license use. Further, improved approaches described herein can use more-detailed criteria for identifying and flagging license misuse scenarios.

VI. EXAMPLE DETECTION OF SOFTWARE LICENSE MISUSE

Some software can be installed on and executed by a server device (or multiple server devices) within managed network 300. Access to this software, and thus the services, data, etc. that the software provides, can be granted by way of a license. Such licensed software (also referred to herein as "licensed software applications") can be licensed per user, per computing device, based on one or more metrics (e.g., licensed for use in making only a predefined number of purchase orders), or in other manners.

When accessing the licensed software, a communication session (also referred to herein as a "session") can be established and conducted via a connection between a computing device and the server device running the licensed software. During such a session, the computing device can receive data stored in a database associated with the server device, transmit data to the server device for the server device to write to the database, or perform other actions. Further, the server device can be configured to collect and store, in the database, records of such sessions. These records (also referred to herein as "session records") can include a variety of information associated with the sessions, including but not limited to network addresses (e.g., IP addresses) of computing devices that are involved in the sessions.

Accessing the licensed software can occur in various ways. For example, a user can access the licensed software directly by way of a user interface delivered with or as part of the licensed software. For instance, the user interface may be provided as part of a software application developed by the licensor and installed on a user's computing device, and a licensed user can use the user interface to log on to access the licensed software.

Alternatively, a user can access the licensed software indirectly by way of an "intermediary package," such as an intermediary software application or intermediary platform, that is not part of the licensed software but that has an integration with the licensed software. For example, a user having an account associated with the intermediary package can access the licensed software via the intermediary package. Such an intermediary package can include software custom-built by the enterprise and/or software developed by a third-party. Further, this intermediary package can be executable by one or more computing devices associated with managed network 300 or elsewhere (e.g., a computing device outside of managed network 300).

For example, an HR department may use HR software supporting an integration with the licensed software and an IT department may use IT software supporting an integration with the licensed software. As a more particular example, the enterprise may build a software application for tracking goods sold by the enterprise and accordingly updating corresponding records maintained by the licensed software for the enterprise. Other examples are possible as well.

The manner in which software is licensed to an enterprise for indirect access use can vary, and thus, scenarios in which an enterprise can be considered to be misusing (e.g., violating) a license can vary as well.

In an example licensing scenario, the enterprise may be required to purchase a number of licenses equal to a number of users that will be indirectly accessing the licensed software, regardless of how many intermediary packages are being used to access the licensed software. Thus, when the enterprise purchases indirect access licenses for a particular number of users and no more than that particular number of users are indirectly accessing the licensed software, the enterprise is compliant with its license agreement. However, if the number of users indirectly accessing the licensed software exceeds the particular number, the enterprise may be in violation of the license agreement.

Figure 6:
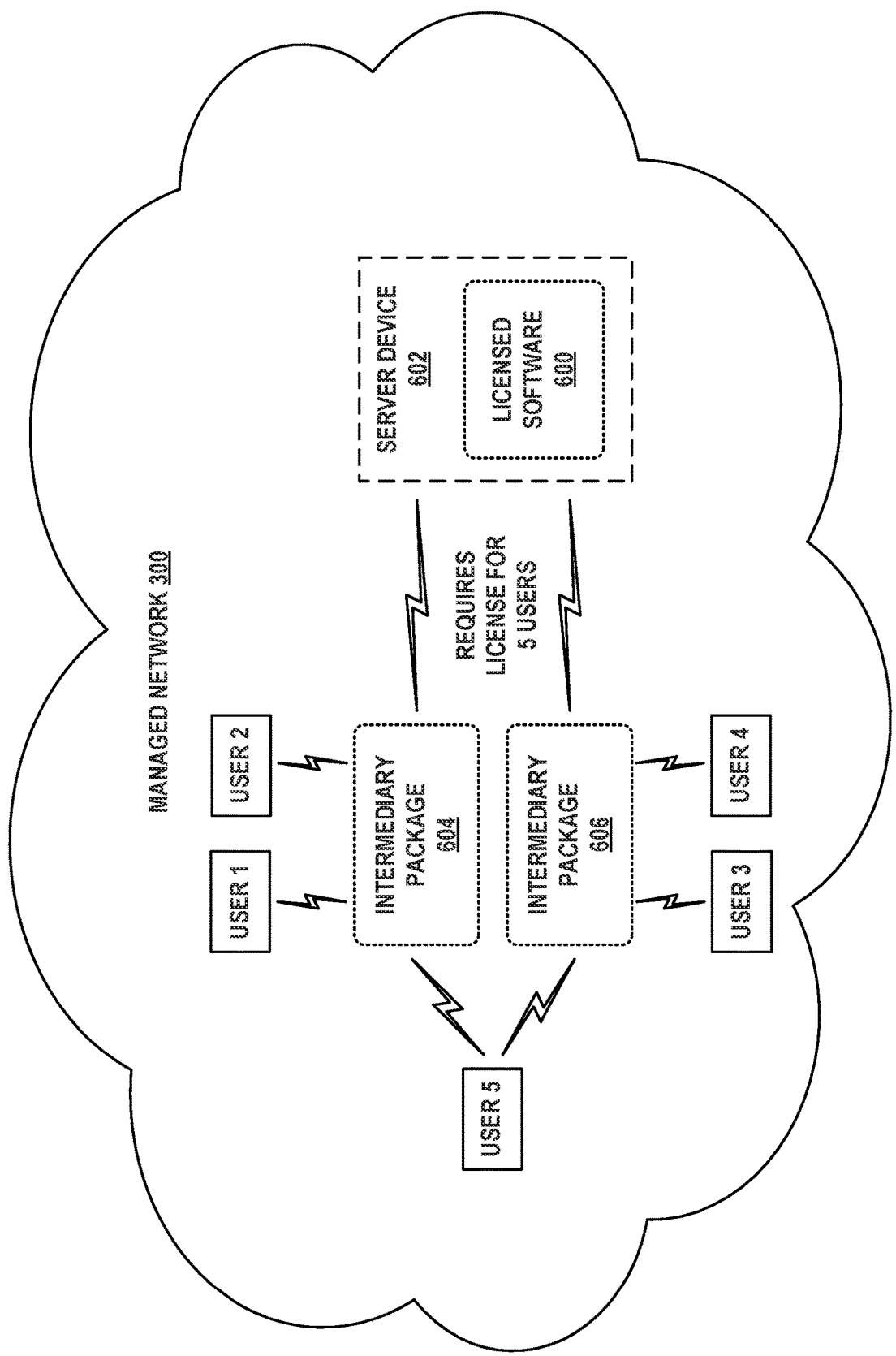
FIG. 6 depicts a scenario in which licensed software is accessed in a managed network, in accordance with example embodiments.

FIG. 6 illustrates an example of this licensing scenario. As shown in FIG. 6, an enterprise is using two different intermediary packages in managed network 300 to indirectly access licensed software 600 installed on server device 602: intermediary package 604 and intermediary package 606. In this example, User 1 and User 2 are shown to be using intermediary package 604 to indirectly access licensed software 600, User 3 and User 4 are shown to be using intermediary package 606 to indirectly access licensed software 600, and User 5 is shown to be using both intermediary packages 604, 606. Even though User 5 is using both intermediary packages 604, 606, the enterprise in this scenario may be required to purchase of only five licenses because the total number of users indirectly accessing licensed software 600 is five. Further, if User 1, User 2, User 3, and/or User 4 began using both intermediary packages 604, 606, the enterprise would not be violating its license. However, if an additional user (e.g., User 6, not shown in FIG. 6) begins using one or both of intermediary packages 604, 606, such as by using the same account as any one or more of the other users, the enterprise may then be in violation of the license.

As another example licensing scenario, the enterprise may purchase an indirect access license that authorizes a limited number of transactions between the enterprise and the licensed software per year, such as a limited number of purchase orders or other transactions placed per year using the licensed software. Additionally or alternatively, the enterprise may purchase an indirect access license that authorizes a limited amount of data (e.g., a limited number of bytes) to be transmitted per year. In either scenario, if within a given year the enterprise exceeds the limitations specified by the respective licenses, the enterprise may be in violation of the license. Other example scenarios are also possible, as well as variations or combinations of the scenarios described above.

In these and other scenarios, misuse of indirect access licenses, whether intended or unintended by the enterprise and its associated users, can render the enterprise liable for additional license fees and possibly place the enterprise at risk of penalties resulting from license misuse. Therefore, it is desirable for an enterprise to be able to efficiently and accurately detect various scenarios of indirect access license misuse, particularly when the enterprise's managed network incudes large quantities (e.g., thousands) of computing devices, users, intermediary packages, etc. In addition, as the enterprise changes, it can be desirable for the enterprise to be able to change the types of scenarios that are detected as misuse.

Accordingly, the present disclosure provides a software application for detecting activity indicative of misuse of licensed software licenses. In particular, the software application can be configured to analyze session records stored by the server device on which the licensed software is running, as well as analyze network layer traffic to and from the server device. Based on these analyses, the software application can identify one or more sessions that meet a set of license misuse criteria and identify a "target computing device"—namely, a computing device related to the managed network that is involved in the identified session(s) and that is a potential source of misuse of one or more licensed software licenses held by the enterprise. Thus, the software application can flag (e.g., store, and possibly display, an indication that identifies) the target computing device as a potential source of misuse of one or more of such licenses. In addition, the software application can be configured to use device, application, and service discovery information to build viewable maps of interconnected computing devices in the managed network used to provide and access the licensed software. These maps can be used to identify which computing devices (and perhaps, in turn, which intermediary packages) are being used within the managed network to access the licensed software.

Although operations are discussed herein primarily with respect to detecting scenarios of indirect access license misuse, such operations could also be performed for detecting misuse of direct access licenses or other types of licenses. As such, the target computing device that is identified and flagged could be a computing device used to directly access the licensed software, or could be a computing device that runs an intermediary package used to indirectly access the licensed software.

Implementations of this disclosure provide technological improvements that are particular to computer networks and computing systems, for example, managed computer networks such as managed network 300.

Computing network-specific technological problems, such as inefficiency, unreliability, and complexity of monitoring software license usage in managed networks—particularly large managed networks with hundreds or thousands of computing devices, software applications, and user activity thereon—can be wholly or partially solved by the implementations of this disclosure. For example, implementations of this disclosure provide a tool that can reduce time spent by an enterprise in accurately detecting potential sources of license misuse within the enterprise's managed network and in turn can reduce any undesirable consequences associated with such misuse. To facilitate this, for instance, implementations of this disclosure can provide the enterprise with the ability to dynamically define customized criteria, or to use predefined criteria, for flagging a computing device as a potential source of license misuse. Further, implementations of this disclosure can provide a way for the enterprise to obtain detailed information about sessions between computing devices within the enterprise's managed network and server devices running licensed software. This detailed information can advantageously provide insight into the time, extent, and nature of such sessions, as well as the extent and nature of data communicated during such sessions, which can enable the enterprise to identify potential sources of license misuse and make more informed decisions in response to detecting license misuse. In addition, the ability to detect sources of license misuse, as well as the detailed information, can enable the enterprise (e.g., administrators, or users that are unknowingly contributing to the license misuse) to learn about scenarios in which license misuse occurs and take proactive action to prevent future occurrences.

These and other improvements are described in more detail below, though the operations described below are for purposes of example and that implementations may provide other improvements as well.

Figure 7:
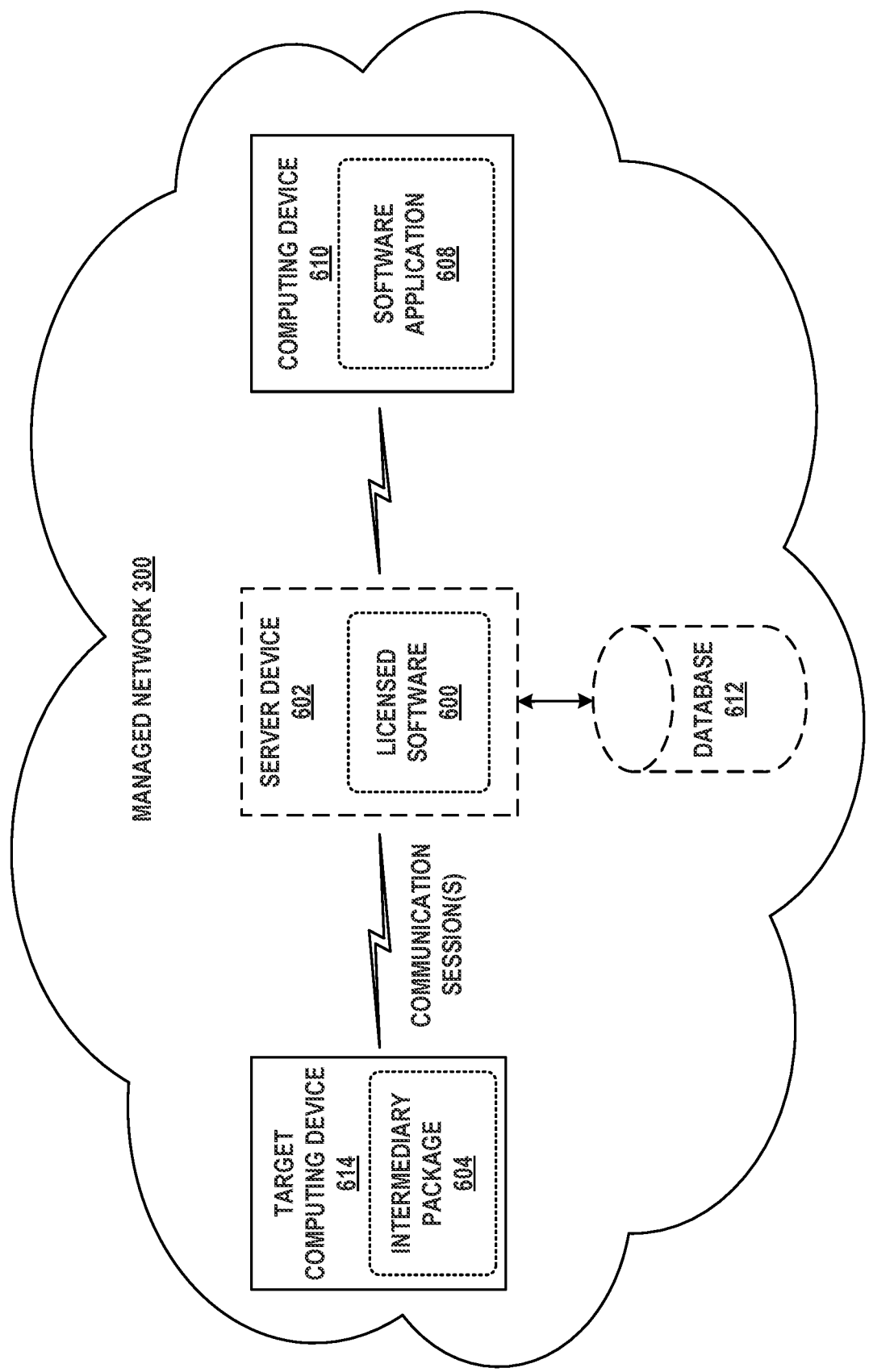
FIG. 7 illustrates a communication environment in which a software application can detect scenarios of potential license misuse, in accordance with example embodiments.

FIG. 7 illustrates an example communication environment in which a software application, software application 608, can detect scenarios of potential license misuse. As shown, software application 608 is executable on a computing device 610 within managed network 300. Within examples, computing device 610 can be one of the proxy servers 312 shown in FIGS. 3, 4, 5A, and 5B, and in addition to executing software application 608 to perform operations related to detecting license misuse, can facilitate performance of any one or more of the proxy server operations discussed above. Within other examples, software application 608 can be an application that is (i) provided for use by managed network 300 as part of a computational instance of remote network management platform 320, such as computational instance 322, that is dedicated to managed network 300, and (ii) executable on a computing device of the computational instance. Alternatively, software application 608 might be software that is not associated with remote network management platform 320. Further, computing device 610 can take the form of any one or more computing devices discussed herein, such as computing device 100, one of client devices 302 shown in FIG. 3, or another computing device.

Computing device 610 is shown to be in communication with server device 602 on which licensed software 600 is installed. Further, server device 602 is shown to be in communication with a database 612. In line with the discussion above, database 612 can be a database in which server device 602 stores records of sessions between computing devices of managed network 300 and server device 602. Together, server device 602 and database 612 are a licensed system within managed network 300.

As discussed above, computing devices related to managed network 300 can be used to directly and/or indirectly access server device 602, and thereby access licensed software 600, in accordance with one or more licenses. Target computing device 614 is shown as a representative example of such a computing device. In the context of indirect access, it will be assumed that target computing device 614 is configured to run one or more intermediary packages through which a user can indirectly access server device 602. As a representative example, intermediary package 604 is shown.

In an example process for indirectly accessing the licensed system, target computing device 614 may establish a connection with server device 602 over which target computing device 614 can log on to and conduct a session with server device 602. Server device 602 may reserve one or more TCP port numbers to use for the session and may use a particular IP address for the session. Further, target computing device 614 may establish the connection and communicate with server device 602 in accordance with one or more application layer communication protocols. Such a communication protocol may define a process for establishing the connection, logging on to server device 602, exchanging data between target computing device 614 and server device 602, and/or other aspects of the session. In an example session, for instance, target computing device 614 may make a remote function call that causes server device 602 to execute instructions associated with the function call and perform one or more operations defined by the instructions. On the other hand, server device 602 could similarly make a function call that causes target computing device 614 to perform one or more operations.

In some implementations, the communication protocols may be protocols proprietarily associated with a licensor, and both target computing device 614 and server device 602 may be configured to communication according to the protocol. As a more particular example, the licensed system may be a SAP® system and the protocol may be a remote function call (RFC) protocol. Other examples, both proprietary and non-proprietary, are possible as well. And other examples of indirectly accessing the licensed system are also possible.

Furthermore, for the purposes of example herein, a "session" can include efforts to engage in a session, regardless of whether those efforts subsequently resulted in the session being conducted. For example, a computing device's failed attempt of establishing a connection with server device 602 and/or a failed attempt at logging on to server device 602 after a connection is made can still be considered a session of which server device 602 may store a record indicating the connection attempt and/or log-on attempt, along with other information.

In line with the discussion above, software application 608 can be configured to carry out operations described in connection with a process for detecting license misuse. An example implementation of this process will now be described in more detail with respect to FIG. 7.

In the example implementation, software application 608 may communicate with server device 602 to access the records stored in database 612. This may involve software application 608 establishing a connection with server device 602 in a manner described above, and then proceeding to access the records via the connection. Within examples, software application 608 may log on to server device 602 via a web portal or other means via which software application 608 can access the records. Additionally or alternatively, software application 608 may transmit, to server device 602, a request to access at least a portion of the records, which may trigger server device 602 to in turn query database 612 for the requested records and transmit copies of the requested records to computing device 610.

In some implementations, managed network 300 may include multiple licensed systems (i.e., server device(s) and associated database(s)) and a license held by the enterprise may allow for a user to access one or more of these licensed systems. Thus, in these implementations, before software application 608 analyzes any records to identify potential license misuse, software application 608 may access and aggregate records from each of these systems. While records from one licensed system might not indicate a potential license misuse scenario, records from another system or a combination of records from multiple licensed systems might indicate such a scenario.

As discussed above, the records stored in database 612 can take the form of tables or other data structures that include a variety of information that server device 602 logged for sessions between computing devices in managed network 300 and server device 602. Within examples, the records of a given server device, such as server device 602, can include, for a given session, (i) a network address (e.g., IP address) of a computing device involved in the session, such as target computing device 614 or another device running an intermediary package, (ii) a type of connection over which the session occurred (e.g., RFC connection or another protocol), (iii) a user identifier (e.g., user ID or user profile ID) associated with the account involved in the session, (iv) whether the user identifier is associated with one or more licenses held by the enterprise, (v) conditions of the license(s) associated with the user (e.g., how long the license term is and/or how many transactions the enterprise or user is licensed to make with licensed systems), (vi) a number of failed log-on attempts by the user, (vii) a time at which the user last logged on to server device 602, (viii) an identifier (e.g., name or number) of server device 602, (ix) an amount of data (e.g., a number of bytes) server device 602 received from the computing device, (x) an amount of data server device 602 sent to the computing device, (xi) a total duration of the session (e.g., represented in milliseconds), (xii) a number of transactions that occurred, (xiii) respective times at which the transactions occurred, (xiv) respective durations of the transactions, (xv) a total duration during which the server device 602 received data, (xvi) a total duration during which the server device 602 sent data, (xvii) a TCP or UDP port number server device 602 used, (xviii) a network address of server device 602, (xix) an indication of whether an attempt was made to connect with server device 602, (xx) a hostname that identifies the computing device, such as a hostname that identifies target computing device 614, (xxi) a path name that indicates where (e.g., a name of a directory in a file system, and/or a file name) the computing device can locate resources (e.g., files or other data associated with the licensed software) provided via server device 602 during the session, and/or (xxii) a name of a function that was called as part of a transaction or other action during the session, among other possibilities.

FIG. 8A and FIG. 8B depict example records associated with sessions in which licensed software is accessed. In particular, FIG. 8A is a record 800 associated with a particular user, User_1, for a particular session conducted between target computing device 614 and server device 602. Further, FIG. 8B is a record 802 associated with two transactions that occurred during the session. In particular, the record 802 includes two different occurrences of the same type of function call, FUNCTION X, during the session. In other examples, the record 802 could include two or more different function calls that were made during the session. Each of the records 800, 802 include at least some of the information described above.

In database 612, or perhaps in a different database, additional information associated with various users in managed network 300 may be stored. Examples include, for a given user profile (i) one or more known user identifiers associated with the user, (ii) one or more known email addresses associated with the user, (iii) a first and last name of the user, and/or (iv) one or more departments of the enterprise in which the user works, among other possibilities. Software application 608 may access this information as well, in addition to the records discussed above.

License agreements for licensed software may vary from enterprise to enterprise. Thus, software application 608 can advantageously enable the enterprise (e.g., a user such as an administrator) to customize a set of license misuse criteria so that the enterprise can target specific types of license misuse scenarios to detect. Ultimately, it is desirable to detect scenarios in which the enterprise exceeds a given license's scope.

Accordingly, using a set of license misuse criteria, software application 608 can parse the records to identify (e.g., flag) a potential license misuse scenario, namely, a set of one or more sessions between a given target computing device and server device 602 that meet the set of license misuse criteria. In addition, software application 608 can parse the records to identify the network address of the target computing device involved in the set of sessions. Software application 608 can then use the target computing device's network address to identify the target computing device, such as by querying a database (e.g., CMDB 500) to determine whether a computing device is associated with the network address of the target computing device. For instance, the database might return a unique alphanumeric identifier of the target computing device, a location of the target computing device within managed network 300, and/or other information identifying the target computing device. Further, software application 608 can flag the target computing device as a source of potential license misuse, such as by storing an indication in memory accessible to software application 608.

Software application 608 could be configured to perform this process, including accessing records for use in the process, on demand or on a predefined repeated basis, such as hourly, daily, monthly, or yearly, with the same or new criteria between performances.

The set of license misuse criteria can include one or more criteria used individually or in combination to detect license misuse. Along these lines, each criterion in the set of license misuse criteria can be considered to be criterion that, when met by one session or a combination of sessions in which a given target computing device is involved, triggers software application 608 to flag the session(s) as a set of sessions that is/are a source of potential license misuse. A determination of whether a given criterion is met can involve comparing at least a portion of the record information and/or user profile information described above to a threshold. Further, a determination of whether a given criterion of the set of license misuse criteria described herein is met can involve whether the criterion is met over a particular period of time (e.g., seconds, minutes, hours, days, weeks, etc.). In some examples, a criterion may involve a sliding window of time. For instance, given a sliding window of two minutes, a determination of whether the criterion is met can involve determining whether the criterion was met within the two minutes preceding the determination.

One criterion may be a number of bytes transmitted during the set of sessions exceeding a threshold number of bytes. For example, if the number of bytes sent from server device 602 to target computing device 614 and/or received by server device 602 from target computing device 614 exceeds a threshold number of bytes (e.g., 1 gigabyte), software application 608 may flag the set of sessions and target computing device 614. As another example, if during the set of sessions the number of sent/received bytes per unit time exceeds a threshold number of bytes (e.g., more than 600 kilobytes are sent and/or received in one second), software application 608 may similarly flag the set of sessions and target computing device 614.

Another criterion may be the set of sessions including more than a threshold number of sessions. This particular criterion may take various forms. For instance, the criterion could take the form of the set of sessions including more than a threshold number of non-simultaneous sessions per unit time (e.g., a second, fifteen seconds, at any instant, etc.). As an example, if target computing device 614 is involved in more than ten non-simultaneous sessions in a two minute span of time (e.g., a first session lasting ten seconds, followed by a second session lasting fifteen seconds, followed by a third session lasting five seconds, and so on), software application 608 may flag the sessions and target computing device 614. Additionally or alternatively, the criterion could take the form of the set of sessions including more than a threshold number of simultaneous sessions. In particular, target computing device 614 may be involved in a number of simultaneous sessions with server device 602 (possibly with each having the same source IP address and destination IP address, but different port numbers at target computing device 614), and if the number exceeds a threshold, the sessions and target computing device 614 can be flagged. For example, if target computing device 614 is involved in more than two sessions at a time, software application 608 may flag target computing device 614. In another example, target computing device 614 may be flagged if it is involved in more than one session at a time.

Similarly, in other implementations, if target computing device 614 has made more than a threshold number of connection attempts and/or more than a threshold number of log-on attempts with server device 602 within a period of time—regardless of whether the connection was actually established and whether a session was subsequently conducted—software application 608 may flag target computing device 614.

Another criterion may be the average session duration of the set of sessions exceeding a threshold duration (e.g., a minute, two minutes, five minutes, etc.). For example, if the average duration of the session(s) in which target computing device 614 is involved exceeds ten minutes, software application 608 may flag target computing device 614.

Another criterion may be a number of function calls made during the set of sessions exceeding a threshold number of function calls, such as if target computing device 614 makes more than ten function calls in a session, or makes more than thirty function calls over a series of sessions. In either case, software application 608 may flag target computing device 614.

Another criterion may be that a function call of a specific type was made during the set of sessions. For example, software application 608 could flag a specific function call, and if target computing device 614 is involved in a session during which target computing device 614 made the specific function call, software application 608 may flag target computing device 614.

In some implementations, software application 608 may identify various commonalities among sessions other than a single target computing device, and may flag such commonalities. For example, software application 608 may identify within the records that the same username (or other identifier associated with an account for licensed software 600) is being used in each session of a set of sessions. In turn, software application 608 may flag the username and/or may engage in efforts to determine which client devices or other devices are being used in managed network 300 to log on to server device 602 via target computing device 614 with the username. In a related example, software application 608 may determine that the set of sessions includes more than a threshold number of sessions for which the username was used to log on to server device 602 and, in response to making such a determination, may flag the username as a source of potential license misuse.

As another example, software application 608 may identify that a series of sessions are being conducted at the same time each day and/or each session of the series has the same duration, and may flag such sessions, target computing device(s) involved in such sessions, and/or other information. Other example commonalities are possible as well. And other example license misuse criteria are possible as well.

As noted above, software application 608 can use the target computing device's network address to identify target computing device 614 so that software application 608 can flag target computing device 614. To facilitate this, software application 608 can use at least some of the discovery processes or the information gained therefrom. For example, CMDB 500 may correlate various configuration items to identifiers thereof, such as correlating the IP address of target computing device 614 to a unique alphanumeric identifier of target computing device 614. Thus, software application 608 can request and receive, from CMDB 500, an identifier of target computing device 614 that CMDB 500 correlates with the IP address of target computing device 614. However, if such information is not contained in CMDB 500, such as if target computing device 614 has not yet been discovered, and thus target computing device 614 cannot be identified, software application 608 could be configured to use the IP address of target computing device 614 to cause target computing device 614 to be discovered. For instance, software application 608 could transmit an instruction to one of proxy servers 312 to in turn transmit a discovery probe to the IP address of target computing device 614 to obtain information about target computing device 614, which can be stored in CMDB 500. These and other discovery processes could also be used to determine which applications or other software is running on target computing device 614, such as intermediary package 604.

Software application 608 can be configured to invoke additional operations that might provide additional help to an enterprise in identifying sources of potential license misuse. One such operation is service mapping, which is described in more detail in the following section. In essence, service mapping can be used to visually depict which devices that run intermediary packages are communicating with server device 602, or any other server(s) associated with licensed software 600. And in some scenarios, service mapping and associated techniques could be used to determine and visually depict which client devices or other devices are communicating with the intermediary packages to access server device 602.

VII. EXAMPLE SERVICE MAPPING IN CONNECTION WITH LICENSE MISUSE

Generally, service mapping may involve a computational instance obtaining information related to sets of interconnected computing devices and applications, operating on managed network 300, that are configured to provide a service, such as providing services associated with licensed software 600. Service mapping can build viewable maps of the configuration items (e.g., the computing devices, applications, and any related configuration information or profiles) used to provide the service. Dependencies between these configuration items may be based on relationships between the computing devices and applications.

Thus, a service map may be a visual representation on a web-based GUI, for instance, that depicts particular applications operating on particular computing devices in the managed network as nodes in a graph. The edges of the graph may represent physical and/or logical network connectivity between these nodes.

In the context of the present disclosure. this visual representation can allow users to rapidly identify devices and applications that are connecting to server device 602 and/or other server devices associated with licensed software 600.

Figure 9A:
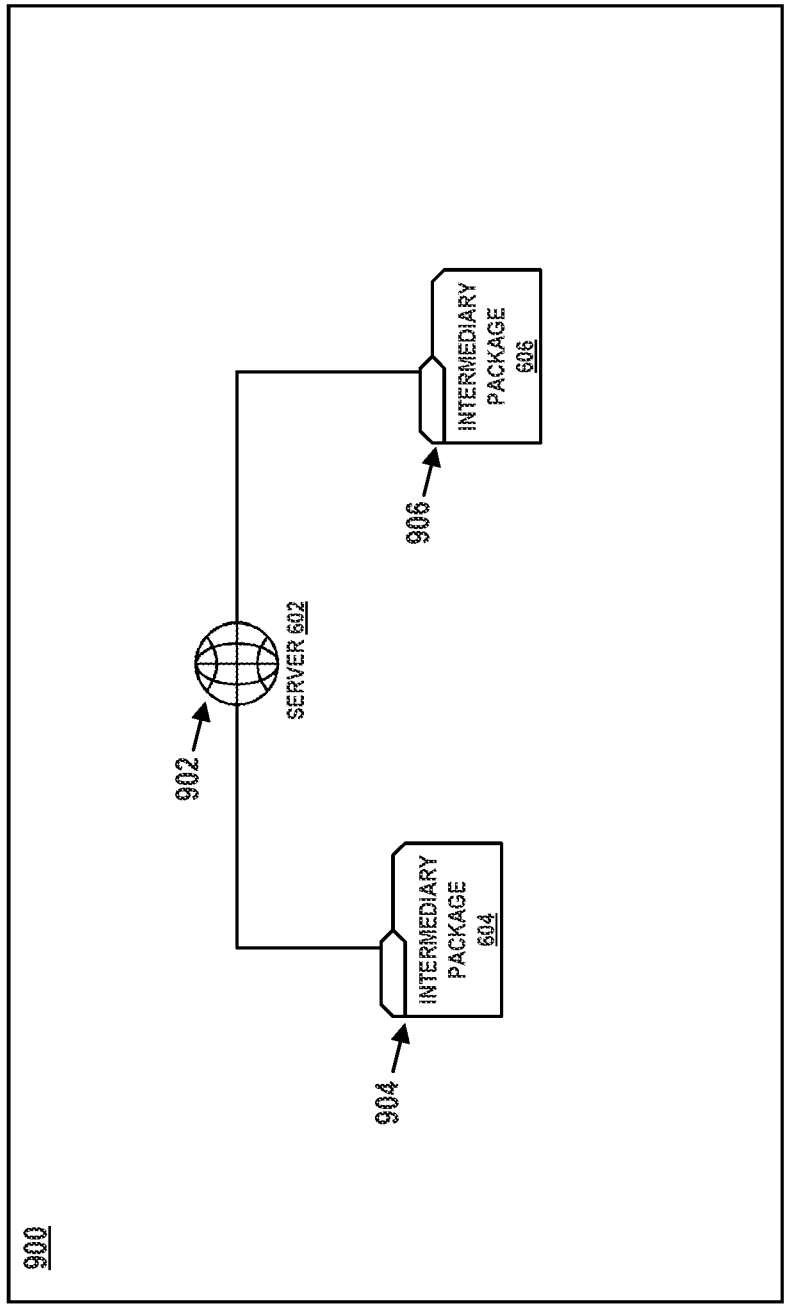
FIG. 9A depicts a service map, in accordance with example embodiments.

FIG. 9A depicts an example of such a service map 900. As shown, service map 900 includes server device 602 and intermediary package 604 (i.e., target computing device 614) visually represented as nodes: node 902 and node 904, respectively. In addition, another intermediary package—intermediary package 606, in this scenario—running on another server device in managed network 300, is visually represented as node 906. Node 904 and node 906 are each shown to be interconnected with server device 602 to represent how the two intermediary packages are being used to access server device 602. Some service maps may include text for each node identifying the device that the node represents. Thus, node 902 includes the name of server device 602, node 904 includes the name of intermediary package 604, and node 906 includes the name of intermediary package 606.

Figure 9B:
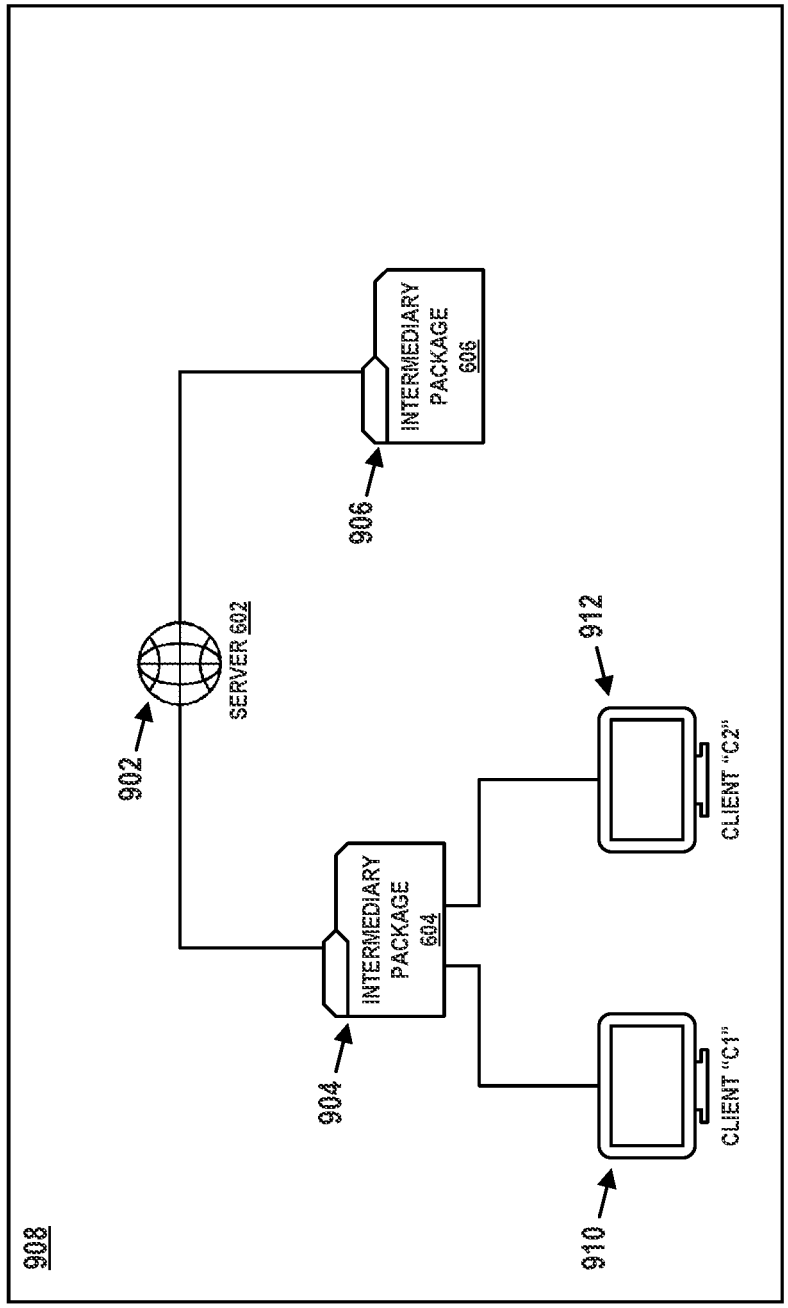
FIG. 9B depicts another service map, in accordance with example embodiments.

FIG. 9B depicts another example service map 908. As shown, service map 908 includes two client devices, named "C1" and "C2," visually represented as nodes: node 910 and node 912, respectively. Node 910 and node 912 are each shown to have an edge connecting the node to node 904, which visually represents the two client devices that are accessing server device 602 via intermediary package 604.

In some implementations, software application 608 may generate and provide for display at least a portion of either of service map 900 and service map 908 in response to various trigger conditions. For example, in response to software application 608 identifying the network address of target computing device 614, software application 608 may display node 902 and node 904 to show the connection between intermediary package 604 and server device 602.

In some implementations, software application 608 may map and display all devices/applications associated with managed network 300 that have connected with server device 602 or other servers associated with licensed software 600. In other implementations, however, software application 608 may only map and display devices/applications that have been flagged or that were involved in sessions that were flagged.

Discovery procedures may be used, at least in part, to determine the relationships between computing devices and applications that define and use services associated with licensed software 600. Alternatively or additionally, services and/or components thereof may be manually defined after discovery has at least partially completed. From this information, a service map can be derived.

The service maps displayed in FIG. 9A and FIG. 9B may be discovered and generated according to various rules. Service mapping may begin or be triggered to begin when a user manually provides, or software application 608 automatically provides, a service mapping application in a computational instance with an address (e.g., a URL, domain name, or IP address) of a service's entry point, such as an IP address of target computing device 614. Based on this input, CMDB 500 may be queried to determine whether one or more computing devices associated with the address exist therein.

If not, pattern-based discovery may be invoked to determine the characteristics of these computing devices and the applications executing on them. Then, service mapping further carries out discovery for any applications related to these newly discovered configuration items. Not unlike the procedures described above, service mapping may involve the computational instance issuing commands to a proxy server in managed network 300, and the proxy server undertaking discovery.

Additionally or alternatively, traffic-based service mapping may be carried out to discover related computing devices and applications by analyzing network traffic. In some cases, traffic-based service mapping can find configuration items that the computational instance fails to find using pattern-based service mapping. Network traffic logs, such as those from a commercially-available network traffic analyzer, may be collected and stored in a network traffic database accessible by the network traffic analyzer, such as a database in managed network 300. Traffic-based service mapping processes these records to identify packet flows and connections between specific applications that were executing on specific computing devices. For instance, the network traffic logs may show that there are persistent or ongoing connections between server device 602 and intermediary package 604. Traffic-based service mapping can also use discovery procedures to log on to computing devices and invoke commands to determine connections involving a particular computing device.

Once service mapping completes, information regarding the discovered computing device(s) and application(s) can be stored in CMDB 500.

In some implementations, operations related to traffic-based service mapping can be used as an additional or alternative method for identifying target computing device 614. The traffic logs may include, for example, the source IP address, destination IP address, source TCP port, and/or destination TCP port of each packet transmitted to and from server device 602. In this way, the source IP address, possibly in combination with the source TCP port, can be used to identify an initiating application/device of a connection between server device 602 and another device. Likewise, the destination IP address, possibly in combination with the destination TCP port, can be used to identify the receiving application/device of the connection. The detection of one or more packets transmitted from a particular source to a particular destination is indicative of a relationship between the applications/devices identified by the respective IP addresses and/or port numbers.

Further, the traffic logs can be used to determine or corroborate the amount of data that is transmitted during a given session. In particular, software application 608 or other device could use the traffic logs to count the detected bytes transmitted to/from server device 602 for the session.

In some implementations, software application 608 can be configured to determine, or at least narrow down for an administrator or other user, which client devices or other devices are communicating with the intermediary packages to access server device 602. To facilitate this, for example, the traffic logs may include the source IP address, destination IP address, source TCP port, and/or destination TCP port of some or all packets transmitted to and from target computing device 614. Similar to the manner discussed above for determining initiating and receiving applications/devices of a connection between target computing device 614 and server device 602, software application 608 can use this packet information to determine initiating and receiving applications/devices of connections between target computing device 614 and one or more client devices or other computing devices that might have been used to access server device 602 via target computing device 614.

Software application 608 could additionally be configured to use the traffic logs to determine a time when one or more packets were transmitted between target computing device 614 and server device 602, determine a time when one or more packets were transmitted between target computing device 614 and another computing device (e.g., client device "C1" shown in FIG. 9B), and compare the two times. If the times are within a threshold period of time of each other (e.g., ten milliseconds), this may be indicative that the other computing device may have been used to access server device 602 via target computing device 614. Other methods for identifying which client devices or other devices are accessing server device 602 via intermediary packages are possible as well.

In some implementations, traffic log data can be supplemented with other data indicative of communication involving entities in managed network 300. For example, collection software designed for this purpose could be installed to run on one of the proxy servers 312. This collection software could be configured to receive, from one or more switches that communicate with servers in managed network 300, raw data from the communications between the switch(s) and the servers. The collection software might summarize the raw data in a table or other format. The data might corroborate the existence of communication between certain devices first identified by the traffic logs, or might include unique data that traffic-based service mapping or pattern-based discovery techniques did not find. Thus, this data could indicate that packets were transmitted between server device 602 and target computing device 614 and/or between target computing device 614 and one or more client devices.

VIII. EXAMPLE CORRELATION AND CONSOLIDATION OF INFORMATION ACROSS RECORDS TO IMPROVE IDENTIFICATION OF SOURCES OF LICENSE MISUSE

As discussed above, the records (e.g., tables or other data structures) stored in database 612 and/or in other databases associated with the licensed software can include a variety of information. This information may be logged by server device 602 for sessions between computing devices in managed network 300 and server device 602. For example, such information can include, for a given session, (i) a network address (e.g., IP address) of a computing device involved in the session, such as target computing device 614 or another device running an intermediary package, (ii) a user identifier (e.g., user ID or user profile ID) associated with the account involved in the session, (iii) an identifier (e.g., name or number) of server device 602, (iv) an amount of data server device 602 received from the computing device, (v) an amount of data server device 602 sent to the computing device, (vi) a total duration of the session, (vii) a number of transactions that occurred, (viii) a TCP or UDP port number server device 602 used, (ix) a network address of server device 602, (x) a hostname that identifies the computing device, such as a hostname that identifies target computing device 614, (xi) a path name that indicates where (e.g., a name of a directory in a file system, and/or a file name) the computing device can locate resources (e.g., files or other data associated with the licensed software) provided via server device 602 during the session, among other possibilities. As further discussed above, at least some of the information in the records can be used to identify and flag license misuse scenarios.

In some situations, the records (e.g., tables or other data structures) stored in database 612 and/or in other databases associated with the licensed software might individually provide an incomplete picture or an otherwise less desirable set of data for accurately identifying and flagging a computing device such as target computing device 614 that is a potential source of misuse of one or more licenses. Similarly, the records might individually provide an incomplete picture or an otherwise less desirable set of data for accurately identifying and flagging users (e.g., user IDs) who might be using the computing device and are involved in a potential license misuse situation.

Accordingly, it can be advantageous for software application 608 to correlate session information across multiple records (e.g., correlate data entries of one table with data entries of another table), in order to improve the efficiency with which software application 608 identifies and flags computing devices and/or users potentially involved in license misuse situations.

In particular, as an example process, software application 608 can be configured to read a set of multiple records (e.g., across multiple tables) and take, from the set of multiple records, a first type of information shared across the set of records. Using the first type of information as a reference, software application 608 can identify, in two or more records of the set of records, at least one other type of information that is associated with the reference. For example, software application 608 can locate one record with entries that identify, for a particular session between target computing device 614 and server device 602, a user identifier and a hostname. In addition, software application 608 can locate another record with entries that identify, for the same session, the same user identifier as well as a port number that server device 602 used. Software application 608 can determine that the user identifier is the reference that is common between the two records, and thus that the hostname and port number are correlated with each other as well as with the user identifier. Software application 608 might then identify and flag, such as by using the set of license misuse criteria described above, the user identifier and/or the computing device (e.g., target computing device 614) with which the user identifier is associated as a potential source of license misuse. Other types of information can be used as the reference or basis for correlating across multiple records in alternative implementations.

Additional information from one or more records can be correlated with the reference to provide additional helpful information associated with suspected license misuse. For example, while the hostname and/or port number associated with the same user identifier can be useful in determining license misuse by the user, the path name, if present in one or more of the records and correlated with the same user identifier, can indicate to an administrator or other user what resources at server device 602 a flagged user identifier or flagged computing device was attempting to access. The administrator might then take various actions in response, such as temporarily suspending the flagged user/device from accessing resources at that same path name until it is confirmed whether the flagged user/device misused a license. Additionally or alternatively, the path name might be a common path name present across multiple sessions, in which case the administrator or software application 608 might flag the path name and add the path name to the set of license misuse criteria, so that sessions involving the path name can more easily be identified in the future. Other examples are possible as well.

In some implementations, the process can also involve software application 608 generating, from multiple different records, a consolidated record having session information corresponding to the identified/flagged sessions, user identifiers, computing devices, etc., and store the consolidated record at a database accessible by software application 608, such as a local database of computing device 610 or a database associated with one of the computational instances of the remote network management platform 320. In other words, the software application 608 can generate and store a single record (e.g., a single table) that includes the information that was correlated across the multiple records. In some examples, software application 608 can also provide a representation of the single record for display as part of a GUI. Thus, software application 608 can advantageously provide a single source of information—namely, the single, consolidated record—with multiple different fields of information that can be utilized individually or in combination to more accurately identify sources of potential license misuse.

Figure 10:
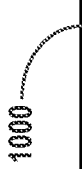
FIG. 10 depicts an example record associated with multiple users who have accessed licensed software, in accordance with example embodiments.

A representative example of this process will now be described with respect to FIG. 10, FIG. 11, and FIG. 12. FIG. 10 and FIG. 11 each show a respective separate example table that software application 608 can read. Software application 608 can further correlate information across the tables of FIG. 10 and FIG. 11 using user identifier as an example reference.

As shown in FIG. 10, record 1000 can include, for each user that has been accessing the licensed software, and from left to right, columns associated with the following fields: user identifier (shown as "User" in FIG. 10), a number of steps (e.g., steps such as the act of opening a particular website, clicking on a hyperlink, etc.) that the user has taken while using the licensed software (shown as "Steps" in FIG. 10), a total amount of time (e.g., in seconds) that the user has been active in the licensed software (shown as "Total CPU" in FIG. 10), a total amount of time (e.g., in seconds) that the user has spent accessing database 612 (e.g., time spent while updating or deleting items in database 612) (shown as "Total DB Time" in FIG. 10), a peak number of instances of the licensed software the user has had opened at one time (shown as "Peak Count" in FIG. 10), a date at which the peak number of instances was captured (shown as "Peak Date" in FIG. 10), a total number of records that the user read from database 612 (shown as "DB Read Record" in FIG. 10), a total number of deletions or other changes that the user made in database 612 (shown as "DB Change Record" in FIG. 10), and a period of time over which values for the aforementioned column fields were collected (shown as "Period" in FIG. 10).

Further, as shown in FIG. 11, record 1100 can include, for each session, and from left to right, columns associated with the following fields: user identifier (again shown as "User" in FIG. 11), a number of transactions that occurred (shown as "Calls" in FIG. 11), a total duration of the session (shown as "Call Time" in FIG. 11), an amount of data server device 602 received from the computing device (shown as "Data Received" in FIG. 11), an amount of data server device 602 sent to the computing device (shown as "Data Sent" in FIG. 11), hostname, path name (shown as "Path" in FIG. 11), and port number (shown as "Port" in FIG. 11).

In accordance with the process described above, software application 608 can generate a consolidated record from record 1000 and record 1100 and provide the consolidated record for display in a GUI. To that point, FIG. 12 is an example GUI 1200 including a consolidated record 1202, which consolidates record 1000 and record 1100 and is associated with multiple communication sessions during which licensed software is accessed. GUI 1200 can represent a GUI that might be provided as part of software application 608 for the purposes of assisting users (e.g., administrators) with determining license compliance.

As shown, the consolidated record 1200 can take the form of a single table that includes session information for one or more users from each of record 1000 and record 1100. As further shown, the single table includes the fields of record 1000 as well as the fields of record 1100. In other examples, additional or alternative fields can be included.

In some implementations, software application 608 can apply, to the consolidated record 1202, the set of license misuse criteria described above in order to identify one or more potential license misuse scenarios among the session data contained in the consolidated record 1202. In other words, software application 608 identify, within the consolidated record 1202, a set of one or more sessions between a given target computing device (or user identifier) and server device 602 that meet the set of license misuse criteria. Further, software application 608 can parse the consolidated record 1202 (and perhaps additionally parse other records stored in database 612) to determine the network address of the target computing device involved in the set of sessions. Software application 608 can then use the target computing device's network address to identify the target computing device, as described above.

As further described above, the set of license misuse criteria can include one or more criteria used individually or in combination to detect license misuse, including but not limited to: a number of bytes transmitted during the set of sessions exceeding a threshold number of bytes, the set of sessions including more than a threshold number of sessions, the average session duration of the set of sessions exceeding a threshold duration (e.g., a minute, two minutes, five minutes, etc.), a number of function calls made during the set of sessions exceeding a threshold number of function calls, and/or that a function call of a specific type (e.g., a flagged type of function call that software application 608 is configured to associate with potential license misuse) was made during the set of sessions.

As further described above, software application 608 can also identify various commonalities among sessions other than a single target computing device and may flag such commonalities. For example, software application 608 may flag a commonly-used username and/or may engage in efforts to determine which client devices or other devices are being used in managed network 300 to log on to server device 602 via target computing device 614 with the username. Other examples are possible as well.

IX. EXAMPLE OPERATIONS

Figure 13:
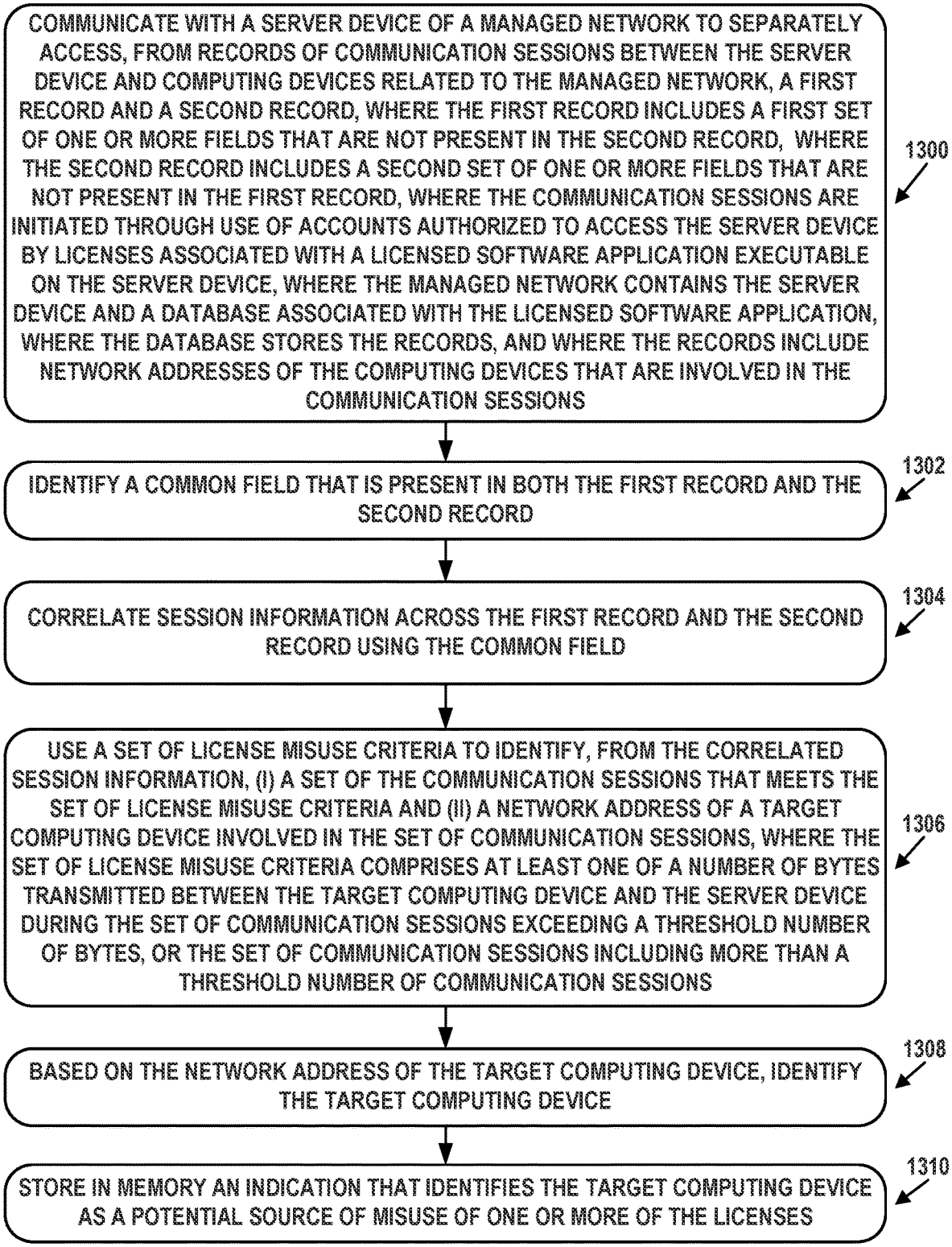
FIG. 13 is a flow chart, in accordance with example embodiments.

FIG. 13 is a flow chart illustrating an example embodiment. The process illustrated by FIG. 13 may be carried out by a computing device, such as computing device 100 and/or a cluster of computing devices, such as server cluster 200. For the purposes of example, the process illustrated by FIG. 13 will be described as being carried out by a software application, such as software application 608, that is executable on a computing device of a managed network, such as computing device 610 of managed network 300. Additionally or alternatively, software application 608 could be executable on a computing device of a computational instance of remote network management platform 320, such as computational instance 322. However, the process can be carried out by other types of applications, devices, or device subsystems. For example, the process could be carried out by a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 involves communicating with a server device of a managed network to separately access, from records of communication sessions between the server device and computing devices related to the managed network, a first record and a second record. The first record may include a first set of one or more fields that are not present in the second record, and the second record may include a second set of one or more fields that are not present in the first record. The communication sessions may be initiated through use of accounts authorized to access the server device by licenses associated with a licensed software application executable on the server device. The managed network may contain the server device and a database associated with the licensed software application. The database may store the records, and the records may include network addresses of the computing devices that are involved in the communication sessions.

Block 1302 involves identifying a common field that is present in both the first record and the second record.

Block 1304 involves correlating session information across the first record and the second record using the common field.

Block 1306 involves using a set of license misuse criteria to identify, from the correlated session information, (i) a set of the communication sessions that meets the set of license misuse criteria and (ii) a network address of a target computing device involved in the set of communication sessions. The set of license misuse criteria may comprise at least one of a number of bytes transmitted between the target computing device and the server device during the set of communication sessions exceeding a threshold number of bytes, or the set of communication sessions including more than a threshold number of communication sessions.

Block 1308 involves based on the network address of the target computing device, identifying the target computing device; and Block 1310 involves storing in memory an indication that identifies the target computing device as a potential source of misuse of one or more of the licenses.

In some embodiments, the process may involve consolidating the first record and the second record into a single record that includes the common field, the first set of one or more fields, and the second set of one or more fields and, in response to consolidating the first record and the second record into the single record, storing the single record in a database associated with the computational instance and accessible by the computing device.

In some embodiments, the common field may include, for a particular communication session of the communication sessions between the server device and a particular one of the computing devices, a user identifier associated with an account involved in the communication session. Further, the first set of one or more fields may include, for a particular communication session of the communication sessions between the server device and a particular one of the computing devices, one or more of: an amount of data the server device received during the particular communication session, an amount of data the server device sent during the particular communication session, a total duration of the particular communication session, or a number of transactions that occurred during the particular communication session. Still further, the second set of one or more fields may include, for a particular communication session of the communication sessions between the server device and a particular one of the computing devices, one or more of: a hostname of the computing device, a port number used by the server device in the particular communication session, or a set of one or more path names that indicate one or more directories of a file system accessed during the particular communication session.

In some embodiments, the process may involve consolidating the first record and the second record into a single record that includes the common field, the first set of one or more fields, and the second set of one or more fields and, in response to consolidating the first record and the second record into the single record, generating and providing for display a graphical user interface including a table representative of the single record. In particular, the table can be generated and displayed such that the common field, the first set of one or more fields, and the second set of one or more fields are columns of the table.

In some embodiments, the set of communication sessions including more than the threshold number of communication sessions may comprise the set of communication sessions including more than a threshold number of non-simultaneous communication sessions per unit time. Determining whether the set of communication sessions meets the set of license misuse criteria may involve determining whether the set of communication sessions includes more than the threshold number of non-simultaneous communication sessions per unit time.

In some embodiments the set of communication sessions including more than the threshold number of communication sessions comprises the set of communication sessions including more than a threshold number of simultaneous communication sessions. Determining whether the set of communication sessions meets the set of license misuse criteria may involve determining whether the set of communication sessions includes more than the threshold number of simultaneous communication sessions.

In some embodiments, the process may involve identifying, within the records, a username used to log on to the server device for each communication session of the set of communication sessions, where the username is associated with an account authorized to access the server device. The process may further involve making a determination of whether the set of communication sessions includes more than a threshold number of communication sessions for which the username was used to log on to the server device. And the process may further involve, in response to the determination being that the set of communication sessions includes more than the threshold number of communication sessions for which the username was used to log on to the server device, storing in memory an indication that identifies the username as a potential source of misuse of one or more of the licenses.

In some embodiments, the set of license misuse criteria may also comprise an average duration of the set of communication sessions exceeding a threshold duration.

In some embodiments, there may be a CMDB disposed within a computational instance of a remote network management platform. The CMDB may include network addresses of at least some of the computing devices related to the managed network and correlates the network addresses with identifiers of the at least some of the computing devices. In such embodiments, identifying the target computing device based on the network address of the target computing device may involve requesting and receiving, from the CMDB, an identifier of the target computing device. Alternatively, identifying the target computing device based on the network address of the target computing device may involve (i) determining that the CMDB does not correlate the network address of the target computing device with any identifier of the target computing device, (ii) in response to the determining, causing a discovery probe to be transmitted to the network address of the target computing device, where the discovery probe causes a discovery process to be carried out for the target computing device and the CMDB to store an identifier of the target computing device, and (iii) requesting and receiving, from the CMDB, the identifier of the target computing device.

In some embodiments, identifying the target computing device based on the network address of the target computing device may involve requesting and receiving, from a network traffic database, network traffic logs contained in the network traffic database. The network traffic logs may include, for data packets transmitted to and from the server device during the communication sessions, source IP addresses, a destination IP addresses, source TCP port numbers, and destination TCP port numbers. Identifying the target computing device based on the network address of the target computing device may also involve using at least one of the source IP addresses, the destination IP address, the source TCP port numbers, or the destination TCP port numbers from the network traffic logs to identify the target computing device.

In some embodiments, the process may also involve requesting and receiving, from a network traffic database, network traffic logs contained in the network traffic database. The network traffic logs may include, for data packets transmitted to and from the target computing device, source IP addresses, a destination IP addresses, source TCP port numbers, and destination TCP port numbers. Identifying the target computing device based on the network address of the target computing device may also involve using at least one of the source IP addresses, the destination IP address, the source TCP port numbers, or the destination TCP port numbers from the network traffic logs to identify at least one client computing device involved in the set of communication sessions.

In some embodiments, the process may also involve, in response to identifying the target computing device, generating and providing for display a graphical user interface including the target computing device and the server device visually represented as nodes in a graph, wherein the nodes are connected in the graph by an edge representative of a network connection between the target computing device and the server device.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
one or more hardware processors; and
a non-transitory memory storing instructions that, when executed by the one or more hardware processors, cause the one or more hardware processors to perform actions comprising:
communicating with a server device of a managed network to separately access, from records of communication sessions between the server device and computing devices related to the managed network, a first record and a second record;
identifying a common field value that is present in both the first record and the second record, wherein the common field value comprises an indicator of potential license misuse;

correlating session information across the first record and the second record using the common field value; and in response to identifying the common field value that is present in both the first record and the second record, identifying, from the session information and using a set of license misuse criteria, a set of the communication sessions that meets the set of license misuse criteria.

2. The system of claim 1, wherein the set of license misuse criteria comprises a threshold number of bytes transmitted between the server device and a target computing device, of the computing devices related to the managed network, involved in the set of the communication sessions.

3. The system of claim 1, wherein the actions comprise:
consolidating the first record and the second record into a single record that includes the common field value, a first set of one or more first fields of the first record, and a second set of one or more second fields of the second record; and
storing the single record in a database.

4. The system of claim 1, wherein the actions comprise:
determining a path name indicating one or more resources at the server device that at least one computing device of the computing devices attempted to access during the set of the communication sessions; and
adding the path name to the set of license misuse criteria.

5. The system of claim 1, wherein the set of license misuse criteria comprises a threshold number of connection attempts within a period of time between the server device and a target computing device, of the computing devices related to the managed network, involved in the set of the communication sessions.

6. The system of claim 1, wherein the set of license misuse criteria comprises a threshold number of functions calls made by a target computing device, of the computing devices related to the managed network, involved in the set of the communication sessions.

7. The system of claim 1, wherein identifying, from the session information and using the set of license misuse criteria, the set of the communication sessions that meets the set of license misuse criteria comprises:
determining a username used in each communication session of the set of the communication sessions; and
determining that a number of communication sessions in the set of the communication sessions exceeds a threshold number of communication sessions.

8. The system of claim 1, wherein the set of license misuse criteria comprises a time of day, or a session duration, or both, for each communication session of the set of the communication sessions.

9. The system of claim 1, wherein the first record is representative of a first communication session of the communication sessions, wherein the second record is representative of a second communication session of the communication sessions, and wherein the common field value represents a commonality between the first communication session and the second communication session.

10. A method, comprising:
communicating with a server device of a managed network to separately access, from records of communication sessions between the server device and computing devices related to the managed network, a first record and a second record, wherein the first record includes a first set of one or more first fields that are not present in the second record, and wherein the second record includes a second set of one or more second fields that are not present in the first record;
identifying a common field value that is present in both the first record and the second record, wherein the common field value comprises an indicator of potential license misuse;
correlating session information across the first record and the second record using the common field value; and
in response to identifying the common field value that is present in both the first record and the second record, identifying, from the session information and using a set of license misuse criteria, a set of the communication sessions that meets the set of license misuse criteria.

11. The method of claim 10, comprising:
consolidating the first record and the second record into a single record that includes the common field value, the first set of one or more first fields, and the second set of one or more second fields; and
storing the single record in a database.

12. The method of claim 10, comprising:
determining a path name indicating one or more resources at the server device that at least one computing device of the computing devices attempted to access during the set of the communication sessions; and
adding the path name to the set of license misuse criteria.

13. The method of claim 10, wherein the set of license misuse criteria comprises a threshold number of connection attempts within a period of time between the server device and a target computing device, of the computing devices related to the managed network, involved in the set of the communication sessions.

14. The method of claim 10, wherein the set of license misuse criteria comprises a threshold number of functions calls made by a target computing device, of the computing devices related to the managed network, involved in the set of the communication sessions.

15. The method of claim 10, wherein identifying, from the session information and using the set of license misuse criteria, the set of the communication sessions that meets the set of license misuse criteria comprises:
determining a username used in each communication session of the set of the communication sessions; and
determining that a number of communication sessions in the set of the communication sessions exceeds a threshold number of communication sessions.

16. A non-transitory computer-readable medium comprising computer readable instructions, that when executed by one or more processors, cause the one or more processors to perform operations comprising:
communicating with a server device of a managed network to separately access, from records of communication sessions between the server device and computing devices related to the managed network, a first record and a second record, wherein the first record includes a first set of one or more first fields that are not present in the second record, and wherein the second record includes a second set of one or more second fields that are not present in the first record;
identifying a common field value that is present in both the first record and the second record, wherein the common field value comprises an indicator of potential license misuse;
correlating session information across the first record and the second record using the common field value; and
in response to identifying the common field value that is present in both the first record and the second record, identifying, from the session information and using a set of license misuse criteria, a set of the communication sessions that meets the set of license misuse criteria.

17. The non-transitory computer-readable medium of claim 16, wherein the set of license misuse criteria comprises a threshold number of bytes transmitted between the server device and a target computing device, of the computing devices related to the managed network, involved in the set of the communication sessions.

18. The non-transitory computer-readable medium of claim 16, wherein the set of license misuse criteria comprises a threshold number of communication sessions transmitted between the server device and a target computing device, of the computing devices related to the managed network, involved in the set of the communication sessions.

19. The non-transitory computer-readable medium of claim 16, wherein the operations comprise:
   determining a path name indicating one or more resources at the server device that at least one computing device of the computing devices attempted to access during the set of the communication sessions; and
   adding the path name to the set of license misuse criteria.

20. The non-transitory computer-readable medium of claim 16, wherein the operations comprise:
   consolidating the first record and the second record into a single record that includes the common field value, the first set of one or more first fields, and the second set of one or more second fields; and
   storing the single record in a database.

* * * * *